United States Patent
Huber

(10) Patent No.: US 7,420,732 B2
(45) Date of Patent: Sep. 2, 2008

(54) DISAPPEARING AND APPEARING IMAGE OF AN OBJECT

(75) Inventor: Mark Huber, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 350 days.

(21) Appl. No.: 10/875,761

(22) Filed: Jun. 23, 2004

(65) Prior Publication Data

US 2005/0286129 A1    Dec. 29, 2005

Related U.S. Application Data

(60) Provisional application No. 60/481,013, filed on Jun. 23, 2003, provisional application No. 60/481,012, filed on Jun. 23, 2003.

(51) Int. Cl.
*G02B 5/30* (2006.01)
*G02B 27/28* (2006.01)

(52) U.S. Cl. ..................................... 359/501

(58) Field of Classification Search ................ 359/501
See application file for complete search history.

(56) References Cited

U.S. PATENT DOCUMENTS

| | | | |
|---|---|---|---|
| 1,610,423 A | 12/1926 | Cawley | |
| 2,184,138 A | 12/1939 | Corey | |
| 3,162,008 A | 12/1964 | Berger et al. | |
| 4,384,768 A | 5/1983 | Guzman | |
| 4,406,529 A | 9/1983 | Anthony | |
| 4,500,088 A | 2/1985 | Lasky | |
| 4,501,473 A * | 2/1985 | Stone | 359/501 |
| 4,653,843 A * | 3/1987 | Karelitz | 359/501 |
| 4,736,214 A | 4/1988 | Rogers | |
| 4,805,988 A | 2/1989 | Dones | |
| 5,080,481 A | 1/1992 | Martin et al. | |
| 5,793,470 A | 8/1998 | Haseltine et al. | |
| 5,999,317 A | 12/1999 | Whitney | |
| 6,301,044 B1 | 10/2001 | Huber et al. | |
| 6,447,122 B1 | 9/2002 | Kobayashi et al. | |
| 6,449,088 B1 | 9/2002 | Pettingell et al. | |
| 2004/0105076 A1* | 6/2004 | Huber | 353/20 |

* cited by examiner

*Primary Examiner*—Joshua L Pritchett
(74) *Attorney, Agent, or Firm*—Greenberg Traurig, LLP

(57) ABSTRACT

A process for making a real image of an object appear or disappear to an observer is disclosed. A real image projection system displays a real image of an object. A first polarizer and a second polarizer are utilized to control the appearance and the disappearance of the real image of the object to an observer. By changing the relative angular relationship between a first transmissive axis of the first polarizer and a first transmissive axis of the second polarizer, a real image of an object appears and disappears. In another aspect, a privacy film may be utilized to control the appearance and the disappearance of the real image of the object to an observer. An observer by traveling around the privacy film or the privacy film is rotated; a real image of the object appears and disappears to an observer.

12 Claims, 6 Drawing Sheets

DISAPPEARING AND APPEARING IMAGE OF AN OBJECT

RELATED APPLICATIONS

This application claims priority to U.S. Provisional Application No. 60/481,013 entitled "POLARIZED APPEARING AND DISAPPEARING SYSTEM", filed on Jun. 23, 2003. This application is also related to U.S. Provisional Application No. 60/481,012 entitled "POLARIZED LIGHT VALVE" filed on Jun. 23, 2003. The above-referenced applications' contents are incorporated by reference herein in their entirety.

BACKGROUND

1. Field

This disclosure relates to creating images of objects that appear and disappear. In addition, controlling the rate of change that the images of objects appear or disappearance is also disclosed.

2. Background

Special effects designers are sometimes required to make a real image of an object appear and disappear on cue. For example, an amusement park having a haunted mansion may desire to have a true color image of a floating, ghost-like figure mysteriously appear and just as mysteriously disappear.

Projection systems need to reproduce the true color real image of an object. Projection systems use filters to control light that modify the true color real image of an object. Furthermore, many present real projection systems don't smoothly transition a real image of the object from appearing to disappearing. Prior art projection systems employ a projector that projects onto a screen polarization-encoded images. These polarization-encoded images are imperceptible to an observer viewing the screen. Thus, for this system, an analyzer is required by a user to view the image on the screen.

In another real image projection system, a primary image of an object is linearly polarized and made incident upon a mirror. The mirror polarizes the image and reflects light from the primary image. A fraction of this light is reflected by a first beam splitter. The first beam splitter columinates and transmits light through a first quarter wavelength section. Afterwards, the light travels through a second beam splitter, a second quarter wave section, and a second polarizer. The resulting image is viewed by an observer.

Accordingly, the system suffers from many problems such as indiscriminate signal losses due to multiple beam splitting surface not being preferential to any polarization state. Furthermore, multiple beam splitting surfaces introduce stray light and reflections that appear in the real image of the object causing distortion. In addition, the above systems require a very bright illumination source because of the signal losses due to multiple beam splitting paths. Furthermore, presently available real image systems generate changing surrounding background around the real image of the object, thereby ruining the illusion of a freestanding real image of the object. Furthermore, present passive real image projection systems do not provide for a real image of an object to smoothly appear and disappear in response to the movement of an observer. Finally, polarizers in the above real image projection systems may create dimly lit images having a green surrounding background color while producing a real image of the object with a minimum illumination state.

Thus, there is a need for an improved process for making a real image of an object appear and disappear and that providing other advantages over present systems.

SUMMARY

An improved optical system, as disclosed herein, provides for a real image of an object to appear and disappear by changing the relative orientation between a first and second optical polarizer. For instance, special effects design engineers for studios or movie houses may utilize this improved optical system for producing a real image of an object, such as a floating ghost, that conveniently disappears and reappears.

In one aspect, an improved real image system includes a container and a set of first and second polarizers. The first polarizer has a first transmissive axis, which transmits light that vibrates in the same plane as the first transmissive axis. Light aligned along the first transmissive axis passes through the first polarizer and through an opening in the container. Light though the opening travels to a second polarizer.

The second polarizer has a second transmissive axis that transmits light vibrating in the same plane as the second transmissive axis. The second polarizer blocks, reflects, or transmits light traveling from the first polarizer depending on relative orientations of the first transmissive axis and the second transmissive axis. Light received aligned with the second transmissive axis passes though the second polarizer, and continues to travel to the object and a reflective surface below the object. The reflected light from the object aligned with the second transmissive axis travels back through the opening to the first polarizer. Light is transmitted through the first polarizer to produce a real image of the object depending on the relative orientation of the first transmissive axis to the second transmissive axis.

If the first transmissive axis and the second transmissive axis are oriented substantially orthogonal, the effect is disappearance of the real image of the object. If the first transmissive axis and the second transmissive axis are substantially parallel to each other, the effect is appearance of the real image of the object.

In yet another aspect, the rotation of a relative orientation of the first transmissive axis to the second transmissive axis controls visibility of the real image of the object. The effect is that a user can gradually transition from a visible to an invisible state by rotating the first transmissive axis relative to the second transmissive axis. In this aspect, the real image of the object will maintain its true color image. The polarizers will provide a clear color for maintaining the surrounding background of the object.

Other applications may include convenience stores, train stations, or other locations where a floating real image of an object is displayed periodically. In another example, during the filming of a scary movie, a floating real image of an object mysteriously appears from a puff of smoke to create an illusion of a frightening spirit or apparition. In another application, the improved optical system provides a floating real image of an object magically appearing near a mountain or a tree-lined street for passing observer.

The foregoing and other objects, features, and advantages of the present disclosure will be become apparent from a reading of the following detailed description of exemplary embodiments thereof, which illustrate the features and advantages of the disclosure in conjunction with references to the accompanying drawing Figures.

DETAILED DESCRIPTION

Figure 1A:
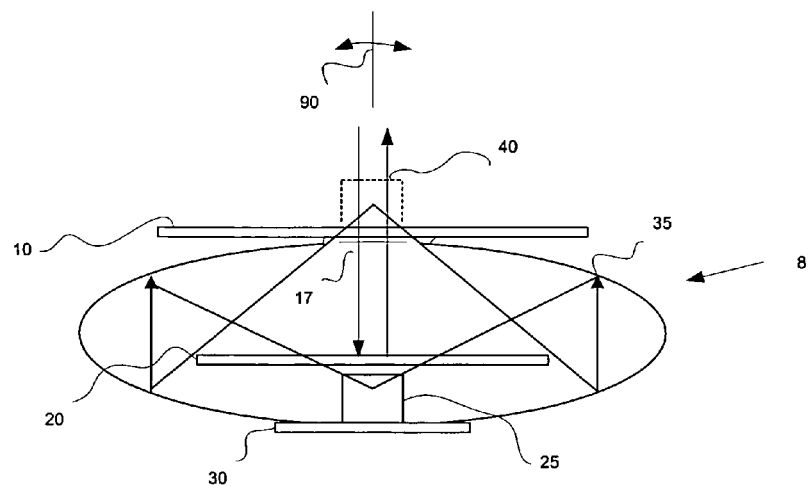
FIGS. 1A and 1B illustrate one embodiment of a real image projection system using a polarizer and an elliptically shaped container.
Figure 1B:
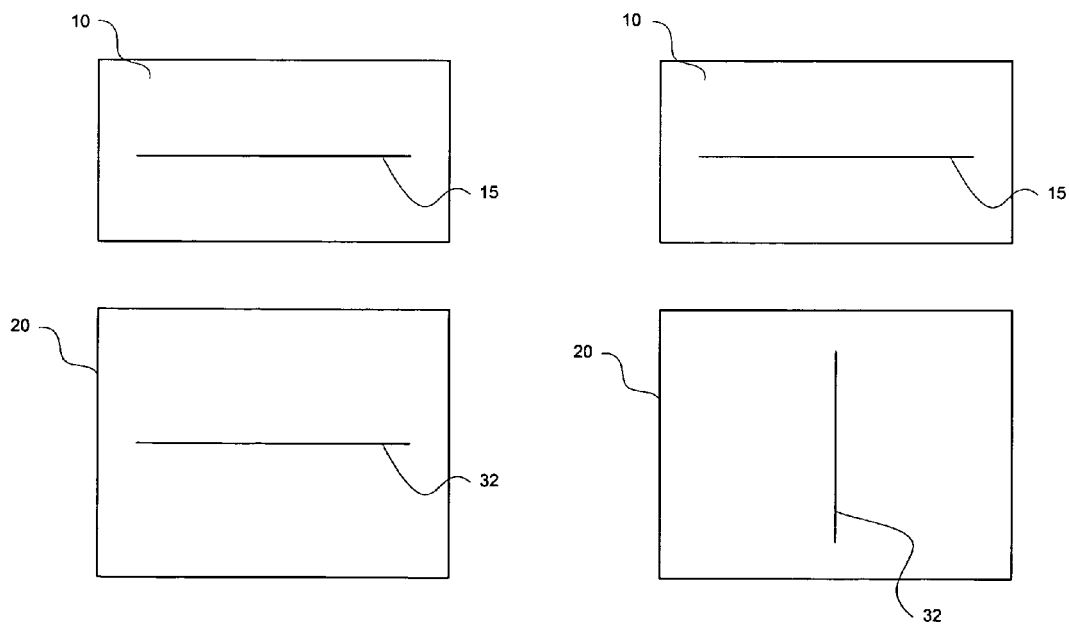

FIGS. 1A and 1B are one embodiment of an improved real image projection system using polarizers and an elliptically shaped container. It should be noted that an observer, throughout this disclosure, is equivalent to and replaceable by a video camera or other like viewing or recording device.

In one aspect, adjusting the relative orientation of a first polarizer and a second polarizer causes transmission or blocking of a real image of the object. The improved real image system includes a container and a set of polarizers. In this system, light rays enter real image projection system 8 through first polarizer 10. Real image projection system 8 is a container made for creating a real image of an object contained within. In one aspect, real image projection system 8 receives light and transmits a real image of the object through opening 17. In one aspect, real image projection system 8 is elliptically shaped and has a plastic exterior with a light reflective interior. In one aspect, the light reflective interior is a mirror. In another aspect, the light reflective interior may be a light reflective interior such the Mirage system provided by OptiGone Associates.

First polarizer 10 is made of a light polarizing material, such as a dual brightness enhancement film (DBEF), a Moxtek aluminum coating deposited on a glass plate, or a functionally equivalent material. The light polarizing material, of which first polarizer 10 is made, has first transmissive axis 15 transmitting light vibrating in the same plane as first transmissive axis 15. The effect is light that is not in the same plane with first transmissive axis 15 is blocked, reflected, or absorbed. Light transmitted through first polarizer 10 and opening 17 is received by second polarizer 20.

Second polarizer 20 is made of a light polarizing material such as a dual brightness enhancement film (DBEF), a Moxtek aluminum film deposited on a glass plate, or a functionally equivalent material. The light polarizing material, of which second polarizer 20 is made, has second transmissive axis 32 transmitting light vibrating in the same plane as second transmissive axis 32. The effect is that light traveling from first polarizer 10 which is in the same plane as second transmissive axis 32 is transmitted to illuminate object 25, while light arriving not in the same plane as second transmissive axis 32 is blocked, reflected, or absorbed.

Object 25 is located between second polarizer 20 and mirror 30. Mirror 30 is a light reflective surface such as a glass plate deposited with a silver coating. Polarized light passing through first polarizer 10 and second polarizer 20 illuminates object 25 and mirror 30.

Light reflected from mirror 30 and object 25 travels back to second polarizer 20. Second polarizer 20 transmits light aligned along the second transmissive axis 32 to opening 17 and to mirror surface 35. In one aspect, mirror surface 35, for example, is a reflective concave surface such as a curved glass plate deposited with a silver coating. In this aspect, mirror surface 35 maintains the same polarization state as that of incident light. Mirror surface 35 reflects incident light through opening 17 to first polarizer 10. First polarizer 10 transmits incident light aligned along first transmissive axis.

The incident light includes real image of the object 40 and surrounding background. Afterwards, real image of the object 40 appears to an observer depending on first transmissive axis 15 alignment to second transmissive axis 32.

If first transmissive axis 15 is aligned substantially parallel (substantially zero degrees) to second transmissive axis 32, as shown in FIG. 1B, then light travels through first polarizer 10. The effect is to create a real image of the object 40 visible to an observer. If first transmissive axis 15 and second transmissive axis 32 are substantially orthogonal (substantially 90 degrees apart), as shown in FIG. 1B, then light is blocked by first polarizer 10. The effect creates no real image of the object 40 visible to an observer. Rotating first transmissive axis 15 relative to second transmissive axis 32 transitions real image of the object 40 from appearing (visible) and to disappearing (invisible) for an observer.

Furthermore, the color of the real image of the object 40 is dependent on the types of polarizers used. In one aspect, if first polarizer 10 and second polarizer 20 are standard organic polarizers, such as Hn-32 made by the company 3M, the final real image will not be true color. Organic polarizers such as Hn-32 add a slight green tint to real image of the object 40 and the surrounding background. In another aspect, however, water clear polarizers, such as Dual Brightness Enhancement Films (DBEF) or Moxtek aluminum on glass polarizers do not add extra color to the real image of the object 40. In one example, therefore, if first polarizer 10 and second polarizer 20 are water clear polarizers, a true color real image of the object 40 is maintained even with polarizer rotational changes. In another example, to create a white color background, first polarizer 10 may be a Diffused Reflective Polarizing Film, DRPF, such as one manufactured by company 3M.

In yet another aspect, a designer can customize the selection of polarizers to maintain the surrounding background of the object. In FIGS. 1A and 1B, there are many possible combinations of polarizers and reflective surfaces. In one aspect, mirror surface 30, second polarizer 20, and first polarizer 10 are reflective surfaces that appear as mirrors. In this instance, similar to as discussed above, aligning first transmissive axis 15 and second transmissive axis 20 substantially orthogonal causes first polarizer 10 to block light. In this aspect, an observer would view a mirror surface through polarizer 10.

In this same aspect, first transmissive axis 15 and second transmissive axis 32 are substantially parallel, light transmits through polarizer 10 and second polarizer 20 creating image of object 40 and displaying surrounding background, which is a mirror surface, produced by mirror 30. In this aspect, as first transmissive axis 15 and second transmissive axis 32 transition from orthogonal to parallel, real image of object 40 transitions from appearing to disappearing. During this transition, the background changes from mirror surface produced by mirror 30 to mirror surface produced by second polarizer 20.

In another aspect, mirror 30 is replaced with a light absorbing cloth to block reflected light produced within real image projection system 8. The light absorbing cloth may be, for example, a black duvateen, or black velvet to produce a surrounding background that is dark. In another alternative, the light absorbing cloth is paint, such that the surrounding background is colored rather than a mirror surface. In this aspect, a special effects design engineer uses miscellaneous reflections from first polarizer 10 to mask or hide the color transition of the surrounding background. This system can be used when the designer wishes to maximize the contrast of the system.

For example, light reflected from object 25 passes through second polarizer 20. Light from second polarizer 20 travels toward opening 17 either directly or by reflecting off of mirror 35. In this alternative, light-absorbing cloth essentially creates a black surrounding background for object 25 which is nearly invisible. Real image of object 40 would appear floating above the real image projection system 8.

In yet another aspect, a special effect engineer may desire only a portion of the object to appear or to disappear on cue. In one alternative, second polarizer 20 is trimmed to fit a top surface of object 25. A portion of object 25 under second polarizer 20 receives polarized light. The other portion of object 25 will be unaffected by the changes in the orientation of first polarizer 10 and second polarizer 20. Therefore, a designer can pick and choose which portion of an object will appear or disappear to an observer. Alternatively, object 25 is replaced by multiple objects. In this alternative, any of the multiple objects may disappear or appear if both polarizers control the transmission of light to each of the objects.

In the alternative, an observer may remain stationary with first polarizer 10 rotating about an axis 90, whereby real image of the object 40 to an observer transitions from appearing to disappearing. Thus, real image projection system 8 gradually transitions real image of the object 40 from a real image of the object 40 from a visible state (appearance state) to an invisible state (invisible state). The effect is to produce optical cross fade of the real image of the object from a visible state to an invisible state.

In another aspect, first polarizer 10 is distally located from opening 17 of the real image projection system 8. This aspect is functionally similar to previously above described embodiments except that light travels through air between first polarizer 10 and opening 17 before light is transmitted to second polarizer 20.

Figure 2A:
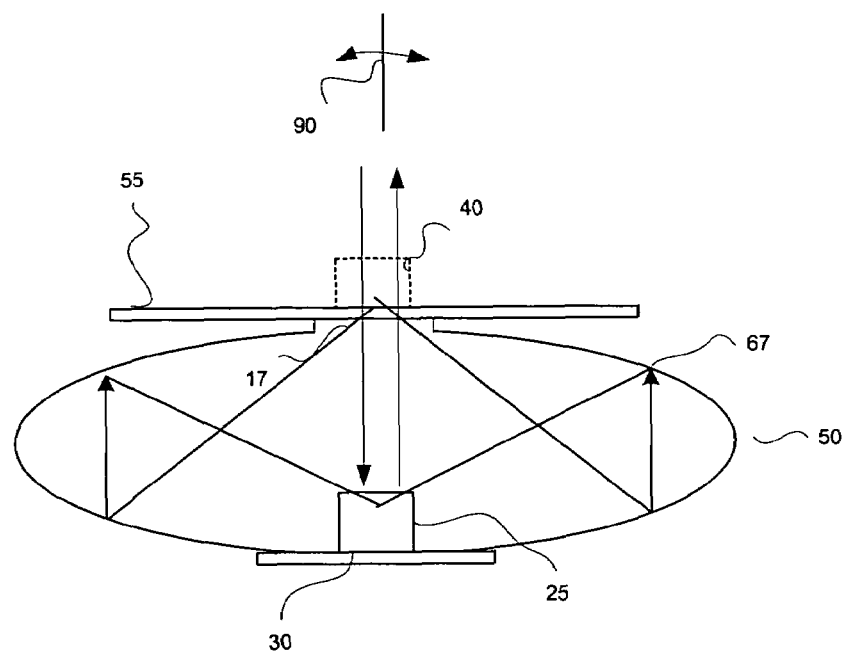
FIGS. 2A and 2B illustrate one embodiment of a real image projection system using a privacy film and an elliptically shaped container.
Figure 2B:
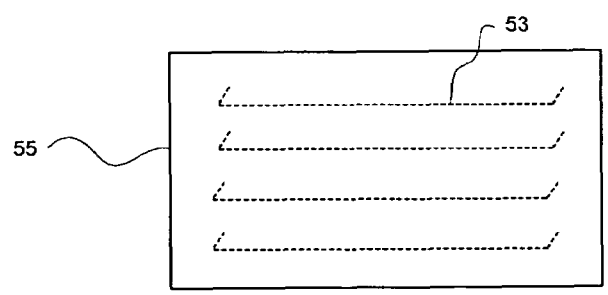

FIGS. 2A and 2B are one embodiment for a real image projection system using a privacy film and an elliptically shaped container.

Light rays enter real image projector 50 through privacy film 55. Privacy film 55 is a light directing film. Privacy film 55 selectively provides real image of the object 40 for an observer located at one location but prevents observers viewing the real image from other locations. For example, privacy film 55 is a micro-louver structure 53. Micro-louver structure 53 provides viewing of an object from certain directions and blocks, i.e., reflects or absorbs, light arriving from all other orientations.

In this system, light passing through privacy film 55 and opening 17 illuminates object 25. Light reflected from object 25 travels to interior surfaces 67, 68 of real image projector 8. Light illuminates object 25 and light absorbing cloth 57. For example, light-absorbing cloth 57 is a black cloth that absorbs nearly all reflected light from a reflective interior surface 67. In this aspect, absorbing cloth 57 creates a black surrounding background for object 25. Interior surfaces 67 or 68 are, for example, a concave reflective surface, but may be any functionally equivalent structure. Light reflected from interior surface 67 and object 25 travels to privacy film 55. Light reflected from object 25 also travels to privacy film 55.

Figure 3:
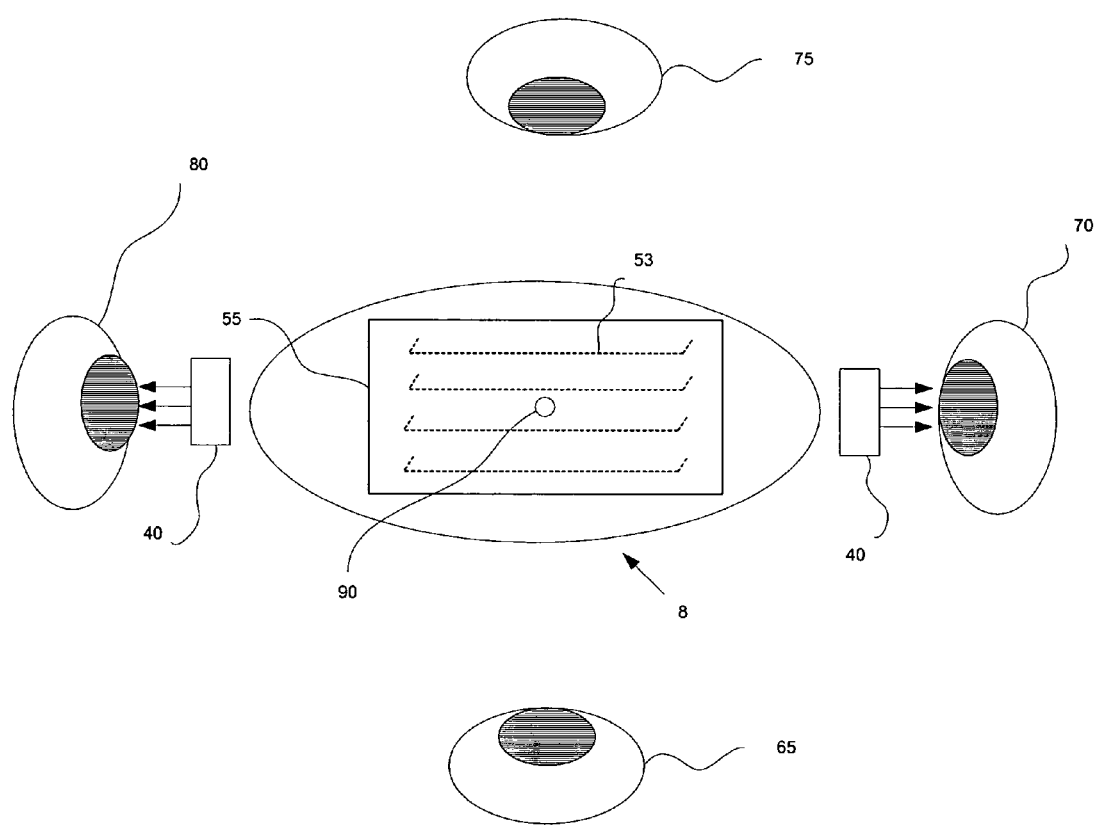
FIG. 3 illustrates a top-view of FIGS. 2A and 2B embodiments as an observer walks around the real image projection system.

FIG. 3 illustrates a top-view of FIGS. 2A and 2B embodiment as an observer walks around the real image projection system. At location 65, the real image of the object 40 is invisible to an observer. As an observer travels to location 70, real image of the object 40 gradually transitions from an invisible state (disappearing) to a visible state (appearing). In another aspect, as an observer travels to location 75, the image of the object 40 is invisible. To an observer at location 80, real image of the object 40 is visible. Further, as an observer moves from location 80 to location 65, real image of the object 40 transitions from various states including: from visible state, to a partially visible state, and to an invisible state.

In the alternative, an observer may remain stationary, and privacy film 55 rotated about an axis 90, whereby real image of the object 40 appears to an observer gradually transitioning from visible (appearing state) to invisible (disappearing state). The effect produces a reversible optical cross fade for transitioning the real image of the object 40 from disappearing to appearing as the privacy film 55 is rotated.

Figure 4:
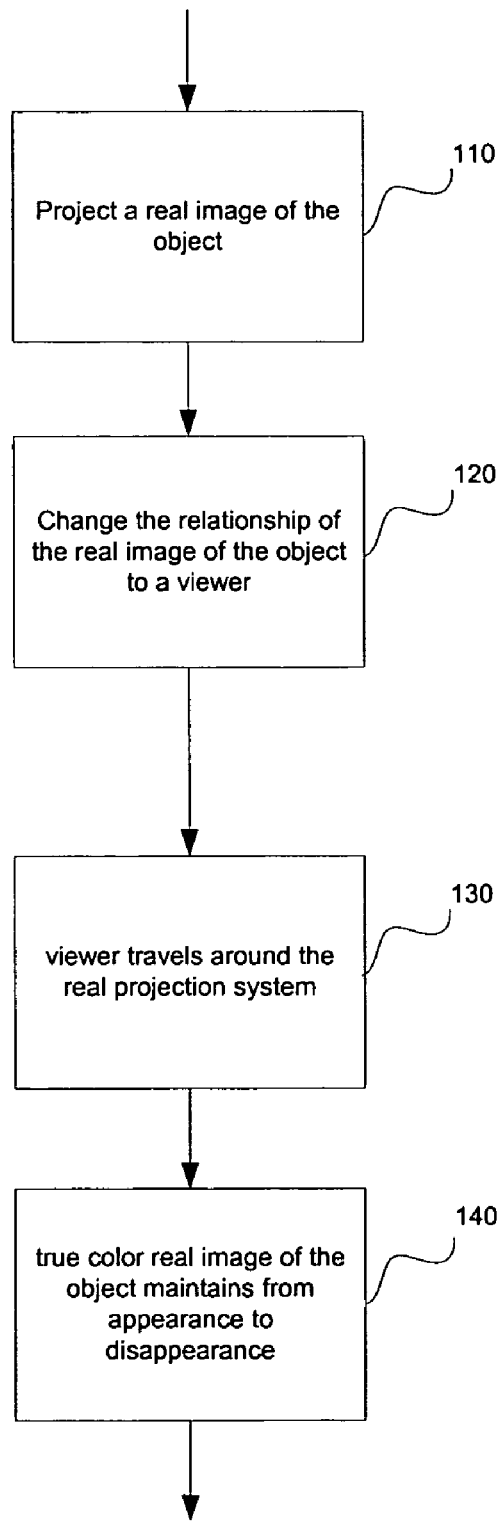
FIG. 4 illustrates the real image projection system.

FIG. 4 illustrates the real image projection system process. A real image projection system projects a real image of an object for an observer as described in block 110. In one aspect, the real projection system may utilize two polarizers that have a first and a second transmissive axis aligned. In this aspect, a real image of the object is produced. In another aspect, the real projection system may use a micro-louver structure that is a light directing film. Changing the relationship of the real image of the object with respect to an observer as described in block 120. In one aspect, changing an orientation relationship between a first transmissive axis of the first polarizer and a second transmissive axis of the second polarizer, the real image of the object transitions from a visible real image of the object to an invisible real image of the object. If the first and the second transmissive axes are substantially parallel, light is transmitted from both polarizers to produce the real image of the object. In this aspect, when the first and the second transmissive axes are substantially perpendicular, light from both polarizers produce no real image of the object. In yet another aspect, the system includes a micro-louver structure. Rotation of the micro-louver structure about an axis changes a real image of an object from disappearing (invisible) to appearing (visible). An observer traveling around the real projection system sees the real image transition from a visible image to an invisible image as described in block 130. During the process, the true color of the real image remains a transition period between the appearance and the disappearance as described in block 140.

Figure 5:
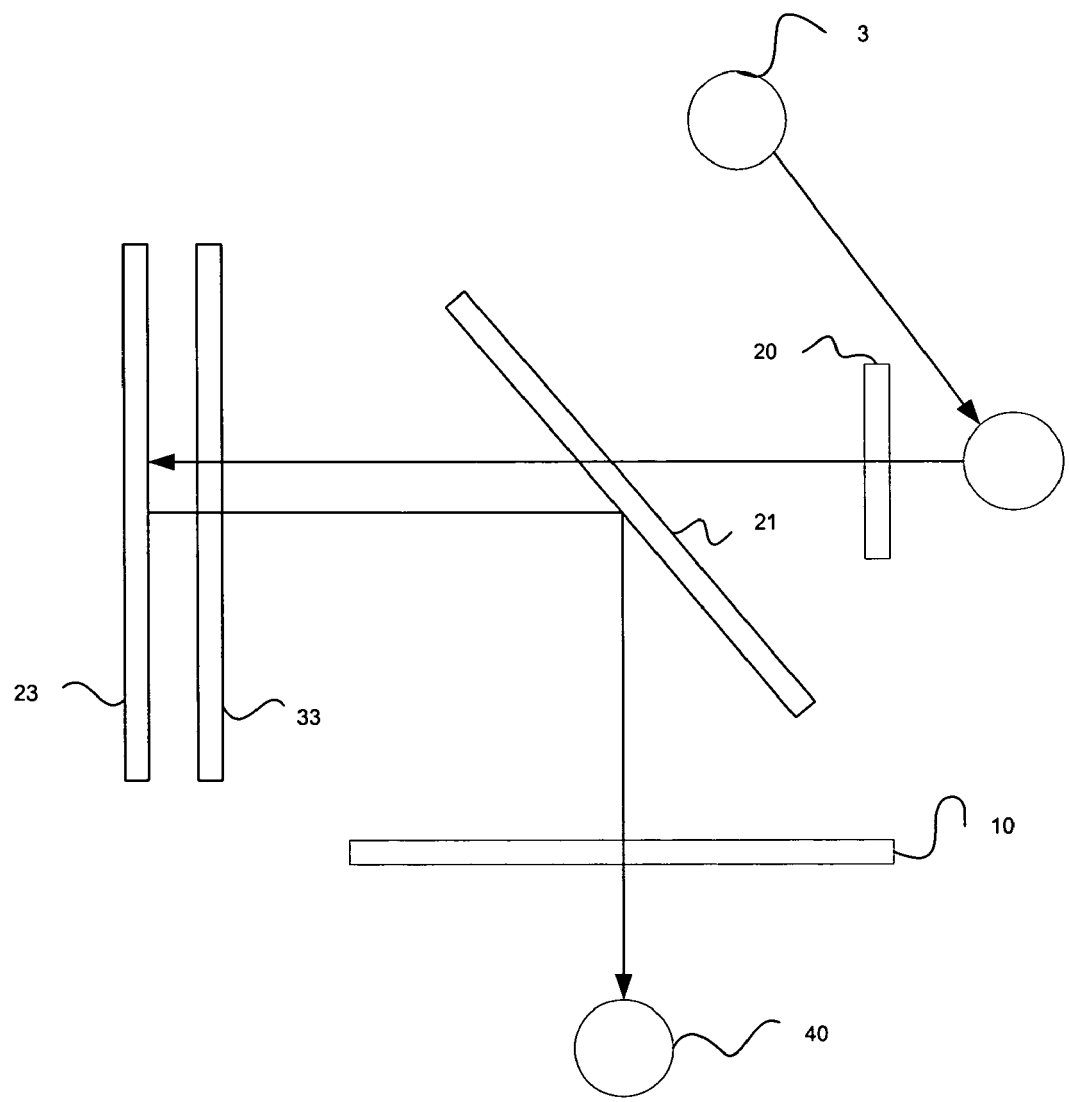
FIG. 5 is another embodiment of the present disclosure utilizing a beam splitter.

FIG. 5 is another embodiment of the present disclosure utilizing a beam splitter. This embodiment functions similarly as FIGS. 1A and 1B embodiments except that the beam splitter and the lens relocate the real image of the object. In this system, light source 3 illuminates object 25. Light travels through second polarizer 20, passes through beam splitter 21 to polarization maintaining lens 33, and off of polarization maintaining reflective surface 23. Light bounces off beam splitter 21 toward first polarizer 10. Insertion and rotation of second polarizer 20 relative to first polarizer 10, similarly as described in the above embodiments, causes the real image of the object 40 to appear and to disappear to an observer.

Figure 6:
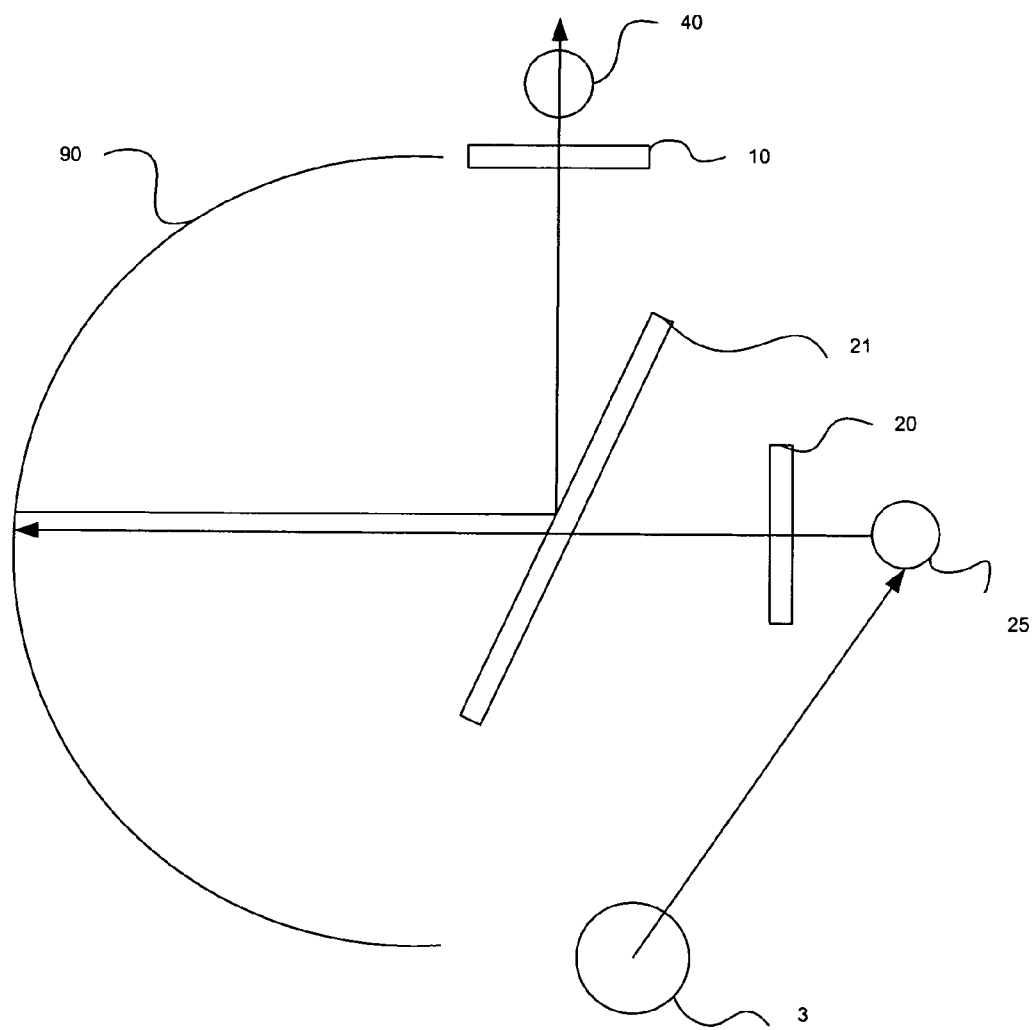
FIG. 6 is another embodiment of the present disclosure utilizing a curved mirror.

FIG. 6 is another embodiment of the present disclosure utilizing a curved mirror. The embodiment functions similarly to FIGS. 1A and 1B except a curved mirror provides for relocating a real image of the object. Light source 3 illuminates object 25. Light travels through second polarizer 20, through beam splitter 21, and off light polarization maintaining mirror 90. Afterwards, light bounces off the beam splitter 21, to produce real image of object 40. Rotation and insertion of first polarizer 10 in the system, similarly as described in the above embodiments, causes the real image of the object 40 to appear and to disappear to an observer.

Information as herein shown and described in detail is fully capable of attaining the above-described object of the disclosure and an embodiment of the disclosure, and is, thus, representative of the subject matter, which is broadly contemplated by the disclosure. The scope of the disclosure fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described embodiment and additional embodiments that are known to those of ordinary skill in the art are hereby expressly incorporated by reference and are intended to be encompassed by the present claims.

Moreover, no requirement exists for a device or method to address each and every problem sought to be resolved by the disclosure, for such to be encompassed by the present claims. Furthermore, no element, component, or method step in the disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set forth in the appended claims. No claim herein is to be construed under the provisions of 35 U.S.C. § 112, sixth paragraph, unless the element is expressly recited using the phrase "means for."

What is claimed is:

1. A method for making a real image of an object appear and disappear, comprising:
    providing a curved container having an opening into an internal space therein and an object in the space within the curved container, the container having a curved mirrored internal surface;
    providing a first polarizer including a first transmissive axis for polarizing light over the object in the internal space;
    providing a second polarizer including a second transmissive axis for polarizing light over the opening into the container;
    directing incident light toward the first polarizer and the second polarizer through the opening;
    changing the angular relationship between the first transmissive axis and the second transmissive axis relative to each other thereby making a real image of the object appear and disappear above the opening; and
    maintaining substantial true color of the real image of the object while transitioning from the appearance of the real image of the object to disappearance of the real image of the object.

2. The method of claim 1 wherein the first transmissive axis and the second transmissive axis are substantially parallel to each other to create the real image.

3. The method of claim 1 wherein the first transmissive axis and the second transmissive axis are substantially orthogonal to each other to make the real image disappear.

4. The method of claim 1 wherein the first and the second polarizer are a dual brightness enhancement film.

5. The method of claim 1 wherein the first and the second polarizer are an aluminum coated glass polarizer.

6. The method of claim 1 wherein the internal mirrored surface is ellipsoidal.

7. The method of claim 6 wherein the container is an ellipsoidal container.

8. The method of claim 1 wherein the polarizers are water clear polarizers.

9. A method for making a real image of an object within a curved container having an opening appear and disappear above the opening, the method comprising:
    placing an object in the curved container, the container having a curved mirrored internal surface;
    positioning a first polarizer including a first transmissive axis for polarizing light over the object in the container;
    placing a second polarizer including a second transmissive axis for polarizing light over the opening in the container;
    directing incident light toward the first polarizer and the second polarizer through the opening; and
    changing the angular relationship between the first transmissive axis and the second transmissive axis of the polarizers relative to each other to make a real image of the object appear and disappear above the opening without changing true color of the real image of the object.

10. The method of claim 9 wherein the internal mirrored surface is ellipsoidal.

11. The method of claim 9 wherein the polarizers are water clear polarizers.

12. The method of claim 9 wherein the container is an ellipsoidal container.

* * * * *